United States Patent [19]

Carlson

[11] Patent Number: 4,889,211

[45] Date of Patent: Dec. 26, 1989

[54] PRINTING PRESS IDLE ROLLER BRAKING SYSTEM

[76] Inventor: Sterling R. Carlson, 306 Bales, Cleburne, Tex. 76031

[21] Appl. No.: 244,025

[22] Filed: Sep. 14, 1988

[51] Int. Cl.[4] .................... F16D 63/00; B41F 5/04; B41F 13/02; B65H 23/08

[52] U.S. Cl. .................................. 188/68; 188/77 R; 188/83; 101/228; 101/416.1; 226/195; 242/75.2

[58] Field of Search ..................... 188/68, 83, 77 R; 101/225, 228, 416 R; 242/75.2; 226/195

[56] References Cited

U.S. PATENT DOCUMENTS

| RE14,263 | 2/1917 | Sears . |
| 196,296 | 10/1877 | Haworth ............................ 242/75.2 |
| 917,814 | 4/1909 | Tuttle . |
| 1,176,840 | 2/1916 | Morse ............................... 101/416 R |
| 1,427,461 | 8/1922 | Henderson ........................ 242/75.2 |
| 1,444,979 | 2/1923 | Meyer .................................... 188/83 |
| 1,499,807 | 7/1924 | Dewey ............................. 188/77 R |
| 2,626,566 | 7/1950 | Pasquinelli . |
| 2,646,081 | 7/1953 | Ritsky ................................ 188/83 X |
| 2,688,385 | 12/1952 | McLaughlin et al. . |
| 2,957,639 | 10/1960 | Muller ................................ 242/75.2 |
| 3,876,027 | 4/1975 | Crise . |
| 4,019,433 | 4/1977 | Cutri, deceased et al. ..... 101/228 X |
| 4,153,142 | 5/1979 | Spisz et al. . |
| 4,211,309 | 7/1980 | Ruggiero . |
| 4,291,598 | 9/1981 | Cherry . |
| 4,688,742 | 8/1987 | Hettich ............................. 188/83 X |

FOREIGN PATENT DOCUMENTS 0360578 11/1931 United Kingdom ............. 188/77 R Primary Examiner—Douglas C. Butler
Assistant Examiner—Richard Potosnak

[57] ABSTRACT

A printing press idle roller braking system is provided with a friction member mounted to the printing press frame for making frictional circumferential contact with an outer circumferential periphery of a cylindrical idle roller to reduce and control the speed of rotation of the cylindrical idle roller to prevent accumulation of ink and lint on the outer circumferential periphery and create tension in the web sheet.

9 Claims, 1 Drawing Sheet

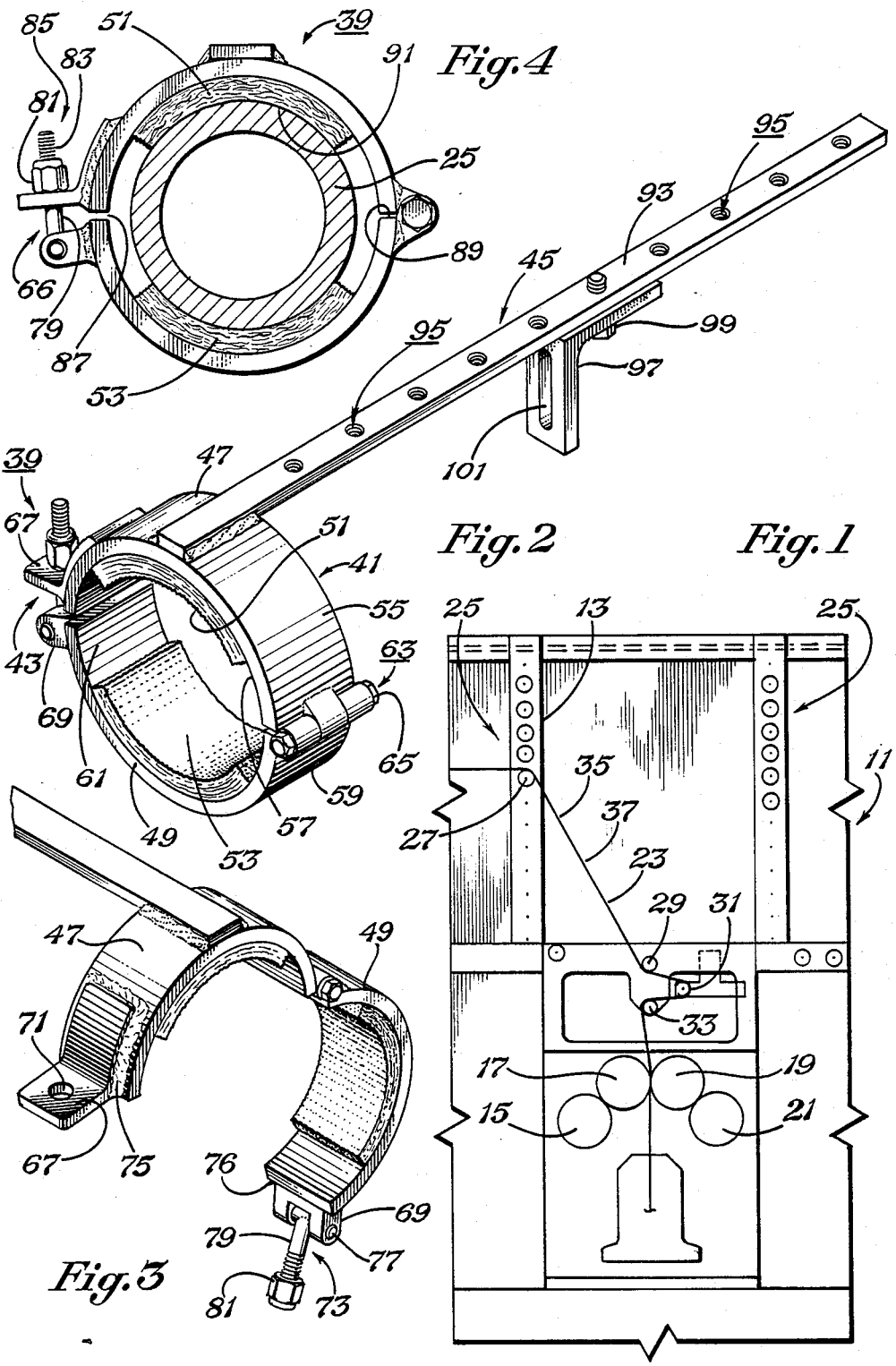

PRINTING PRESS IDLE ROLLER BRAKING SYSTEM

BACKGROUND OF THE INVENTION

1. Field of the Invention:

This invention relates generally to printing presses, and specifically to a printing press idle roller braking system for use with web fed printing presses.

2. Description of the Prior Art:

Idle rollers are commonly used in large and small printing presses to route web sheet paper through the press during the printing process; they do not serve to print images on the web sheet, but rather serve merely to direct web sheets through the printing press frame. In a large press, as many as two hundred idle rollers are employed to route the web sheets. Such idle rollers are generally four inches in diameter and constructed of steel or high impact plastic. Each of the idle rollers rotate freely about a shaft which is secured to the printing press frame. They are not coupled to any means for rotation; rather, they "free wheel" about a shaft at high speeds due to the frictional circumferential contact between the outer circumferential periphery of the outer roller and the web sheet which is pulled through the printing press at very high speeds. It is not uncommon for idle rollers to rotate at speeds in excess of fifteen hundred revolutions per minute. As stated above, the spinning of the cylindrical idle roller is caused entirely by contact with the web sheet as it is pulled through the printing press.

Periodic maintenance must be performed upon the cylindrical idle rollers to ensure the proper operation of the printing press. More specifically, ink and lint from the web sheet tends to accumulate on the outer circumferential periphery of the cylindrical idle roller during the printing process. Such accumulation of ink and lint often interferes with the printing process by producing wrinkles in the web sheet. Therefore, in the prior art, printing presses must be periodically shut down to allow for cleaning of the cylindrical idle rollers with a solvent. To avoid shutting down the printing presses, some printers actually placed solvent on the roller trains, and sheets of paper in the printing press to allow for "self-cleaning" of the idle rollers while the printing press is operated. This practice, however, proved to be hazardous, resulting in many health problems for printers, including skin irritations. Use of the solvents may cause respiratory problems, depression, and other harmful effects on personnel. However, solvents currently used in the industry have come under recent scrutiny from the Occupational Safety and Health Administration (OSHA). In fact, current OSHA guidelines limit the use of certain previously widely used solvents.

SUMMARY OF THE INVENTION

The present invention is a printing press idle roller braking system which minimizes the accumulation of ink and lint on the cylindrical idle rollers of a printing press, thus minimizing the amount of wrinkling of the news print. In most cases the accumulation of ink and lint, and the amount of wrinkling is totally eliminated.

As an apparatus, the present invention comprises a braking system for use in a press for printing on a web sheet routed therethrough in part by a cylindrical idle roller rotated relative to the press at a high speed of rotation by frictional circumferential contact between the outer circumferential periphery of the cylindrical idle roller and the web sheet. The braking system of the present invention includes (a) a means for frictionally engaging at least a portion of the cylindrical idle roller to reduce the high speed of the roller and create tension in the web sheet, (b) a means for adjusting the degree of frictional contact between the cylindrical idle roller and the means for frictionally engaging to control the speed of the cylindrical idle roller and the amount of tension in the web sheet, and (c) a means for mounting the means for frictionally engaging to the printing press.

As a method, the present invention consists of a method of reducing the amount of ink and lint accumulation on cylindrical idle rollers of a printing press for use in a press for printing on a web sheet with ink. A web sheet is routed through the press in part by a cylindrical idle roller rotated relative to the printing press at a high speed by frictional circumferential contact between the outer circumferential periphery of the cylindrical idle roller and the web sheet. The method of the present invention requires a number of steps including providing a friction member, mounting the friction member to the printing press proximate to the cylindrical idle roller and urging the friction member to frictionally engage the cylindrical idle roller, and reduce the high speed of rotation of the cylindrical idle roller.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a printing press in simplified cross-section;

FIG. 2 depicts the braking system apparatus of the present invention in perspective view;

FIG. 3 is a perspective view of the braking system apparatus of the present invention in mounting position;

FIG. 4 depicts in cross-section the braking system apparatus of the present invention in gripping position around a cylindrical idle roller.

DETAILED DESCRIPTION OF THE INVENTION

FIG. 1 depicts a portion of a printing press, including a printing press unit in simplified cross-section view. Printing press unit 11 consists of press frame 13, plate cylinders 15, 21, impression and blanket cylinders 17, 19, and idle rollers indicated generally as 25.

Web sheet 23 is routed through the printing press 11 in part by action of cylindrical idle rollers 25. In FIG. 1, cylindrical idle rollers 25 include rollers 27, 9, 31 and 33 which serve to direct web sheet 23 up toward frame 13 from blanket and impression cylinders 17, 19.

Web sheet 23 is a continuous length of paper which is pulled through printing press 11 at very high speeds for multiple printing runs through printing presses identical to that shoWn in FIG. 1. Each printing run is accomplished through a group of printing units, and may, for example, each provide a different color in a multi-colored publication. In a large printing press, it is not uncommon to find as many as two hundred cylindrical idle rollers for routing web sheet z3 as desired. Cylindrical idle rollers z5 are not coupled to a means for rotating, but simply "free wheel" (rotate about a idle roller shaft which is rigidly coupled to press frame 13) at very high speeds relative to printing press 11. Lint 35 (not visible in FIG. 1), and ink 37 (not visible in FIG. 1) carried by web sheet 23 will accumulate on the outer circumferential periphery of cylindrical idle rollers 25 as web sheet 23 is routed through printing press 11.

FIG. 2 depicts the idle roller brake 39 of the present invention in perspective view. In the preferred embodiment, idle roller brake 39 comprises three functional components. First, means for frictionally engaging 41 is provided to frictionally engage at least a portion of cylindrical idle rollers 25 to reduce the high speed of rotation, and controls tension in web sheet 23. Second, means for adjusting 43 is provided to adjust the degree of frictional contact between a cylindrical idle rollers 25 and means for frictionally engaging 41 to control the speed at which the cylindrical rollers 25 rotates, as well as the amount of tension in web sheet 23. Third, a means for mounting 45 is provided to mount the means for frictionally engaging 41 to printing press 11.

Means for frictionally engaging 41 consists of a plurality of components which cooperate to reduce the speed of rotation of the cylindrical idle rollers 25, and consequently control tension in web sheet 23. The major components of means for frictionally engaging 41 include upper clamp arm 47, lower clamp arm 49, upper resilient gripper 51, and lower resilient gripper 53. Of course, it is to be understood that the directions "upper" and "lower" are utilized solely in this description for the purpose of clarity, since idle roller brake 39 of FIG. 2 may be coupled to press frame 13 in a plurality of orientations.

In the preferred embodiment, upper clamp arm 47 is a semicircular metal plate having a curved outer surface 55, and a curved inner surface 57. Likewise, lower clamp arm 49 consists of a semicircular metal plate having a curved outer surface 59, and a curved inner surface 61. In the preferred embodiment, upper resilient gripper 51 is carried along the inner surface 57 of upper clamp arm 47. Likewise, in the preferred embodiment, lower resilient gripper 53 is carried along said inner surface 61 of lower clamp arm 49. Upper and lower resilient grippers 51, 53 comprise a "squeezable" or resilient material for gripping the outer circumferential periphery of idle rollers 25. It is to be understood that a plurality of upper and lower resilient grippers may be provided along the inner surfaces 57, 61 of upper and lower clamp arms 47, 49, without departing from the scope of the present invention. It is also to be understood that resilient grippers 51, 53 may be formed from a variety of resilient or compressible materials, including rubber and cork, and preferably is formed from brake lining material.

Upper and lower clamp arms 47, 49 are pivotally coupled by a means for pivotally coupling 63, which in the preferred embodiment comprises hinge 65. Means for pivotally coupling 63 allows idle roller brake 39 to be opened to a mounting position (as shown in FIG. 3) for placement around cylindrical idle rollers 25, and for closing in a gripping position (as shown in FIG. 4) around cylindrical idle rollers 25. In the gripping position, upper resilient gripper 51 and lower resilient gripper 53 serve to frictionally and circumferentially contact cylindrical idle rollers 25.

Means for adjusting 43 comprises a plurality of components which cooperate to allow adjustment of the degree of frictional contact between one of the cylindrical idle rollers 25 and means for frictionally engaging 41 for controlling the speed of cylindrical idle rollers 25 and the amount of tension in web sheet 23. In the preferred embodiment, as shown in FIG. 3, these components include upper locking flange 67 which is welded to upper clamp arm 47 at weld 75, lower locking flange 69 which is welded to lower clamp arm 49 at weld 76, and locking member 73 pivotally coupled to lower locking flange 69 at pin 77. Locking member 73 consists of externally threaded rod 79 which is adapted to be inserted in flange bore 71 of upper locking flange 67. Locknut 81 is provided to lock upper clamp arm 47 to lower clamp arm 49. Upper and lower locking flanges 67, 69 and associated components cooperate to form a means for locking 66 which serves to lock upper and lower clamp arms 47, 49 in a gripping position around one of the cylindrical idle rollers 25, as shown in FIG. 4.

In the preferred embodiment, as shown in FIG. 4, idle roller brake 39 is adapted to circumferentially grip cylindrical idle rollers 25 at upper resilient gripper 51 and lower resilient gripper 53. The dimensions of upper and lower clamp arms 47, 49 and upper and lower resilient grippers 51, 53 are adapted according to the particular dimensions of each cylindrical idle rollers 25, not to close around cylindrical rollers 25. More specifically, gaps 87 and 89 are provided between upper and lower clamp arms 47, 49 preventing the upper and lower clamp arms 47, 49 from touching unless upper and lower resilient grippers 51, 53 are compressed by advancement of locknut 81 inward along external threads 83 of externally threaded rod 79. As locknut 81 is advanced along threads 83, upper and lower resilient grippers 51, 53 are compressed against outer circumferential periphery 91 of one of the cylindrical idle rollers 25, and gaps 87, 89 are consequently diminished.

The compression of upper and lower resilient grippers 51, 53 results in an increased frictional contact with outer circumferential periphery 91 of one of the cylindrical idle rollers 25, causing the idle rollers 25 to rotate at a much slower rate in response to the frictional circumferential contact with web sheet 23. Advancement of locknut 81 inward along externally threaded rod 79 increases the frictional contact of upper and lower resilient grippers 51, 53 with cylindrical idle rollers 25. In contrast, outward motion of locknut 81 along externally threaded rod 79 serves to decrease the frictional contact between upper and lower resilient grippers 51, 53 with one of the cylindrical idle rollers 25. In this manner, the desired speed of rotation of cylindrical idle rollers 25 may be set by selecting the amount of frictional contact between upper and lower resilient grippers 51, 53 and the cylindrical idle rollers 25.

Returning now to FIG. 1, the means for mounting 45 is shown in perspective view. In the preferred embodiment, means for mounting 45 comprises a plurality of components including mounting bar 93 welded to upper clamp arm 47 having a plurality of threaded adjustment holes 95 disposed along its length, and mounting bracket 97 which is adjustable in position along the length of mounting bar 93 by coupling threaded mounting bolt 99 to selected threaded adjustment holes 95 as desired. Mounting bracket 97 is an L-shaped bracket having a frame mounting slot 101 disposed perpendicular to mounting bar 93 when mounting bracket 97 is coupled to mounting bar 93 by mounting bolt 99.

In operation, idle roller brake 39 is mounted to press frame 13 of printing press 11 by means for mounting 45. Idle roller brake 39 is adjustable to a plurality of configurations relative to press frame 13, increasing the flexibility of the present invention by allowing its use in a plurality of different printing presses. At installation, upper clamp arm 47 and lower clamp arm 49 are urged apart at hinge 65 for opening in a mounting position for placement around cylindrical idle rollers 25. Thereafter, upper clamp arm 47 and lower clamp arm 49 are urged together, and locked by means for locking 66, which in the preferred embodiment comprises locking member 73 which couples upper locking flange 67 and lower locking flange 69 at flange bore 71 with locknut 81. Idle roller brake 39 is positioned at an outer end of cylindrical idle rollers 25, and does not interfere with or obstruct the passage of web sheet 23 over cylindrical idle rollers 25.

Once idle roller brake 39 is positioned about idle rollers 25 as desired, locknut 81 may be advanced or retracted along threaded rod 79 to increase or decrease the amount of frictional contact between upper and lower resilient grippers 51, 53 and cylindrical idle rollers 25. Of course, the selected amount of frictional contact will determine the speed at which the particular cylindrical idle rollers 25 rotates in response to frictional circumferential contact with web sheet 23. Moreover, the selected amount of frictional contact between upper and lower resilient grippers 51, 53 and cylindrical idle rollers 25 will determine the amount of tension provided in web sheet 23. The slowing of the cylindrical idle rollers 25 cause web sheet 23 to remove the accumulated lint 35 and ink 37 from each cylindrical idle rollers 25. The grippers 51, 53 are tightened to slow the idle rollers 25 speed, but not to stop it completely. Preferably the speed is slowed to about 5-30 revolutions per minute from a speed that could be as high as 1500-1600 revolutions per minute. Thus, lint 35 and ink 37 are removed continuously during the operation of printing press unit 11, eliminating the need for special maintenance of cylindrical idle rollers 25.

The present invention presents a plurality of advantages over existing prior art systems. First, the printing press idle roller braking system of the present invention minimizes ink and lint buildup on cylindrical idle rollers in printing presses. Consequently, wrinkles produced from lint and ink buildup are reduced. Second, under the present invention, the cylindrical idle rollers of a printing press can be automatically cleaned during printing runs, realizing considerable time and cost savings over the prior art systems which require a shut down of the printing press in order to clean the cylindrical idle rollers. Third, the present invention enhances the printing process by creating an even tension in the web sheet, and fostering a more consistent web feed. Fourth, the present invention enhances printing press safety by reducing or eliminating the use of hazardous cleaning chemicals. Further, the present invention enhances safety by reducing the speed of rotation of cylindrical idle rollers from the dangerous speeds of up to approximately 1500-1600 revolutions per minute to a desired speed of less than 100 revolutions per minute and often to a preferred speed of between 5-30 revolutions per minute. Thus, the risk of injury to hands and limbs has been eliminated through use of the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A press comprising in combination:
   a blanket cylinder;
   an impression cylinder in rotating engagement with the blanket cylinder;
   ink distributed on the impression and blanket cylinder;
   a web sheet drawn between said blanket cylinder and impression cylinder for depositing ink on the web sheet;
   a cylindrical freewheeling idle roller located in said press after said blanket and impression cylinders for routing said web sheet after it is drawn between said blanket and impression cylinders, wherein said idle roller is rotated at a high speed by frictional circumferential contact between said web sheet and an outer circumferential periphery of said idle roller, and wherein ink and lint carried by said web sheet may be deposited on said idle roller;
   braking means for frictionally engaging at least a portion of said cylindrical idle roller, to reduce said high speed of said cylindrical idle roller and create a tension in said web sheet;
   adjusting means for adjusting the degree of frictional contact between said cylindrical idle roller and said braking means for controlling the speed of said cylindrical idle roller and the amount of tension in said web sheet;
   means for mounting said braking means to said press; and
   wherein said braking means reduces the high speed of said cylindrical idle roller a selected amount, creating tension in said web to minimize accumulation of lint and ink on said cylindrical idle roller.

2. A press according to claim 1 wherein said cylindrical idle roller is slowed from said high speed to a speed of less than 100 revolutions per minute.

3. A press according to claim 1 wherein said means for frictionally engaging grips at least a portion of said outer circumferential periphery of said cylindrical idle roller to slow the speed of said cylindrical idle roller.

4. A press according to claim 1 wherein said adjusting means allows simultaneous control over said speed of said cylindrical roller and the amount of said tension in said web sheet.

5. A press according to claim 1 wherein said braking means comprises at least one brake shoe for frictionally engaging said outer circumferential periphery of said cylindrical idle roller.

6. In a press, a method of printing on a web sheet with ink, with lint carried by said web sheet comprising in combination the steps of:
   providing a blanket and impression cylinder in rotating engagement;
   providing a cylindrical idle roller adjacent said blanket and impression cylinders;
   providing a friction member;

mounting said friction member to said press proximate to said cylindrical idle roller;

routing said web sheet first between said blanket and impression cylinders;

depositing ink on said web sheet when it is between said blanket and impression cylinders; then routing said web sheet across said idle roller causing said roller to rotate at a high speed due to frictional contact between the idle roller and the web sheet; and urging said friction member into friction engagement with said cylindrical idle roller to reduce the high speed of said cylindrical idle roller, to minimize build up of said ink and lint carried by said web sheet on said cylindrical idle roller.

7. A method according to claim 6 wherein said high speed of rotation of said cylindrical idle roller is reduced to less than 100 revolutions per minute.

8. In a press for printing on a web sheet, with lint and ink carried by the web, said web being routed therethrough in part by a cylindrical idle roller rotated relative to said press at a high speed by frictional circumferential contact between an outer circumferential periphery of said cylindrical idle roller and said web sheet, a braking system comprising:

an upper clamp arm with inner and outer surfaces;

a lower clamp arm with inner and outer surfaces;

at least one upper resilient gripper pad carried by said upper clamp arm along said inner surface;

at least one lower resilient gripper pad carried by said lower clamp arm along said inner surface;

means for pivotally coupling said upper and lower clamp arms, for opening in a mounting position for placement around said cylindrical idle roller, and for closing in gripping position around said cylindrical idle roller with said at least one upper resilient gripper pad and said at least one lower resilient gripper pad urged into circumferential contact around at least a portion of said cylindrical idle roller, providing a frictional resistance to rotation of said cylindrical idle roller to reduce said high speed of rotation;

means for locking said upper and lower clamp arms in said gripping position around said cylindrical idle roller;

means for adjusting the position of said upper and lower clamp arms while locked in said gripping position by means for locking to alter said frictional resistance to said rotation of said cylindrical idle roller to modify said speed of said cylindrical idle roller; and wherein said braking system reduces the high speed of said cylindrical idle roller a selected amount, creating tension in said web and minimizing accumulation of lint and ink on said cylindrical idle roller.

9. In a press for printing on a web sheet routed therethrough in part by a cylindrical idle roller rotated relative to said press at a high speed by frictional circumferential contact between an outer circumferential periphery of said cylindrical idle roller and said web sheet, a braking system according to claim 8 wherein reducing said high speed of rotation of said cylindrical idle roller creates tension in said web sheet.

* * * * *